United States Patent
Bastos et al.

(10) Patent No.: US 9,183,609 B2
(45) Date of Patent: Nov. 10, 2015

(54) PROGRAMMABLE BLENDING IN MULTI-THREADED PROCESSING UNITS

(71) Applicant: NVIDIA CORPORATION, Santa Clara, CA (US)

(72) Inventors: Rui Bastos, Porto Alegre (BR); Mark J. Kilgard, Austin, TX (US); William Craig McKnight, Harvest, AL (US); Jerome F. Duluk, Jr., Palo Alto, CA (US); Pierre Souillot, San Francisco, CA (US); Dale L. Kirkland, Madison, AL (US); Christian Amsinck, Durham, NC (US); Joseph Detmer, Durham, NC (US); Christian Rouet, San Francisco, CA (US); Don Bittel, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 184 days.

(21) Appl. No.: 13/723,092

(22) Filed: Dec. 20, 2012

(65) Prior Publication Data

US 2014/0176568 A1    Jun. 26, 2014

(51) Int. Cl.
*G09G 5/00* (2006.01)
*G06T 1/20* (2006.01)
*G06T 15/50* (2011.01)
*G06T 11/40* (2006.01)

(52) U.S. Cl.
CPC . *G06T 1/20* (2013.01); *G06T 11/40* (2013.01); *G06T 15/503* (2013.01); *G09G 2340/10* (2013.01)

(58) Field of Classification Search
CPC ...... G06T 1/60; G06T 15/503; G06T 2340/10
USPC .................................. 345/559, 561, 592, 629
See application file for complete search history.

(56) References Cited

U.S. PATENT DOCUMENTS

| | | | | |
|---|---|---|---|---|
| 4,823,286 A * | 4/1989 | Lumelsky et al. | ............ | 345/611 |
| 5,185,856 A | 2/1993 | Alcorn et al. | | |
| 5,544,306 A * | 8/1996 | Deering et al. | ............... | 345/545 |
| 6,226,017 B1 * | 5/2001 | Goossen et al. | ............... | 345/531 |
| 6,259,462 B1 * | 7/2001 | Gruber et al. | ................ | 345/561 |
| 6,466,210 B1 * | 10/2002 | Carlsen et al. | ............... | 345/629 |
| 6,982,718 B2 * | 1/2006 | Kilgard et al. | ................ | 345/506 |
| 7,185,856 B2 * | 3/2007 | Bang et al. | ..................... | 244/168 |
| 7,307,667 B1 | 12/2007 | Yeh et al. | | |
| 7,414,632 B1 * | 8/2008 | Piazza et al. | .................. | 345/592 |
| 7,834,879 B2 * | 11/2010 | Komooka et al. | ............. | 345/501 |
| 7,973,797 B2 * | 7/2011 | Jiao et al. | ....................... | 345/582 |
| 8,638,341 B2 * | 1/2014 | Kallio | ........................... | 345/611 |
| 2002/0140703 A1 | 10/2002 | Baker et al. | | |
| 2009/0102857 A1 | 4/2009 | Kallio | | |

FOREIGN PATENT DOCUMENTS

TW    201216200 A    4/2012

OTHER PUBLICATIONS

Dunlop, R., "Effects Part 1: Introduction to Effect Files", Nov. 28, 2014, 5 pages.

* cited by examiner

*Primary Examiner* — Joni Richer
(74) *Attorney, Agent, or Firm* — Artegis Law Group, LLP

(57) ABSTRACT

A technique for efficiently rendering content reduces each complex blend mode to a series of basic blend operations. The series of basic blend operations are executed within a recirculating pipeline until a final blended value is computed. The recirculating pipeline is positioned within a color raster operations unit of a graphics processing unit for efficient access to image buffer data.

19 Claims, 10 Drawing Sheets

US 9,183,609 B2

PROGRAMMABLE BLENDING IN MULTI-THREADED PROCESSING UNITS

BACKGROUND OF THE INVENTION

1. Field of the Invention

The present invention generally relates to multi-threaded computer architectures and, more specifically, to programmable blending in multi-threaded processing units.

2. Description of the Related Art

A number of important graphics rendering standards known in the art as OpenVG, SVG, Cairo, Skia, JavaFX, Adobe Flash, Adobe PDF, Apple's Quartz 2D, and HTML5 require complex blend modes that are not directly supported by conventional graphics processing units (GPUs). As a consequence, graphics content formatted according to these graphics rendering standards is conventionally rendered by a central processing unit (CPU), which is able to implement the complex blend modes using general processing operations. However, the CPU does not provide efficient, high-throughput processing compared to that of a GPU, potentially resulting in comparatively low CPU-based rendering performance for the graphics content.

Conventional GPUs organize graphics rendering work as a series of graphics objects that are each decomposed into a series of fragments, which are then transmitted to a fragment shader. The fragment shader computes a color for each fragment and generates a corresponding shaded fragment, which typically includes color and opacity information. Each shaded fragment is then transmitted to a color raster operations (CROP) unit, which is configured to blend the shaded fragment with color data for a corresponding pixel stored in a frame buffer. The CROP unit conventionally performs this blend operation using a fixed-function sum of two products circuit that does not directly implement the complex blend modes.

One approach to performing complex blend modes needed by the graphics rendering standards within a GPU is to program a fragment shader to implement the complex blend modes. While a fragment shader is highly programmable and able to execute the complex blend modes, read and write latency from the fragment shader to frame buffer memory is sufficiently long in a conventional GPU that rendering performance is crippled and likely falls below that achievable on a contemporaneous CPU.

As the foregoing illustrates, what is needed in the art is a technique for efficiently rendering complex blend modes within a GPU.

SUMMARY OF THE INVENTION

One embodiment of the present invention sets forth a method for performing a programmable blend operation, the method comprising receiving at least source pixel data or destination pixel data for processing based on a sequence of instructions associated with the programmable blend operation, determining that a first blend operation is required, wherein the first blend operation is specified by a first instruction from the sequence of instructions, performing the first blend operation to generate a first blend result, performing a second blend operation to generate a second blend result, wherein the second blend operation is specified by a second instruction from the sequence of instructions, and storing the second blend result. The programmable blend operation may specify an arbitrary sequence of instructions having an arbitrary number of instructions.

Other embodiments of the present invention include, without limitation, a computer-readable storage medium including instructions that, when executed by a processing unit, cause the processing unit to perform the techniques described herein as well as a computing device that includes a processing unit configured to perform the techniques described herein.

One advantage of the disclosed technique is that it enables graphics content requiring complex blend modes to be efficiently rendered by a graphics processing unit.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
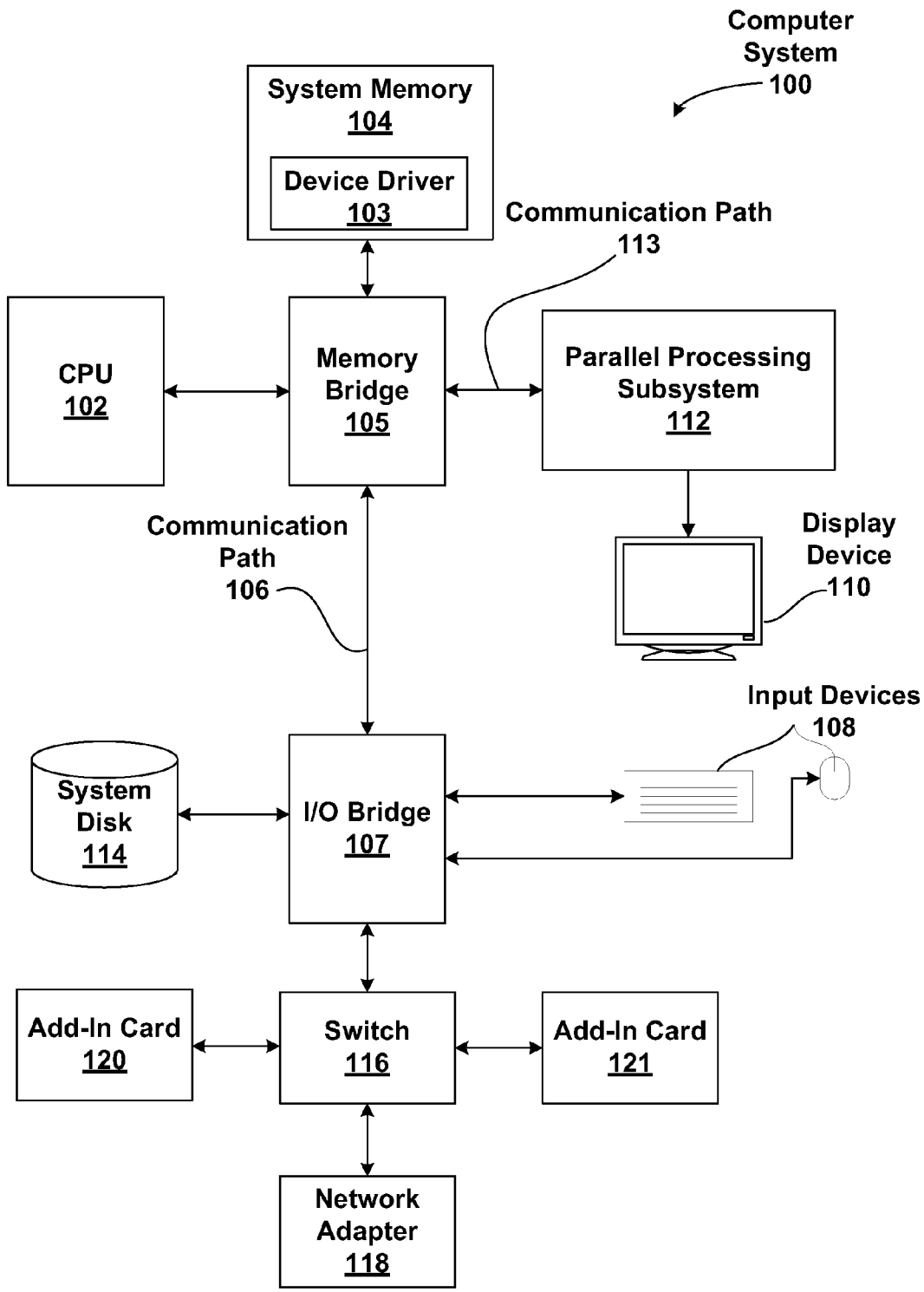
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. A parallel processing subsystem 112 is coupled to memory bridge 105 via a bus or second communication path 113 (e.g., a Peripheral Component Interconnect (PCI) Express, Accelerated Graphics Port, or HyperTransport link); in one embodiment parallel processing subsystem 112 is a graphics subsystem that delivers pixels to a display device 110 (e.g., a conventional cathode ray tube or liquid crystal display based monitor). A system disk 114 is also connected to I/O bridge 107. A switch 116 provides connections between I/O bridge 107 and other components such as a network adapter 118 and various add-in cards 120 and 121. Other components (not explicitly shown), including universal serial bus (USB) or other port connections, compact disc (CD) drives, digital video disc (DVD) drives, film recording devices, and the like, may also be connected to I/O bridge 107. The various communication paths shown in FIG. 1, including the specifically named communication paths 106 and 113, may be implemented using any suitable protocols, such as PCI Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing subsystems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
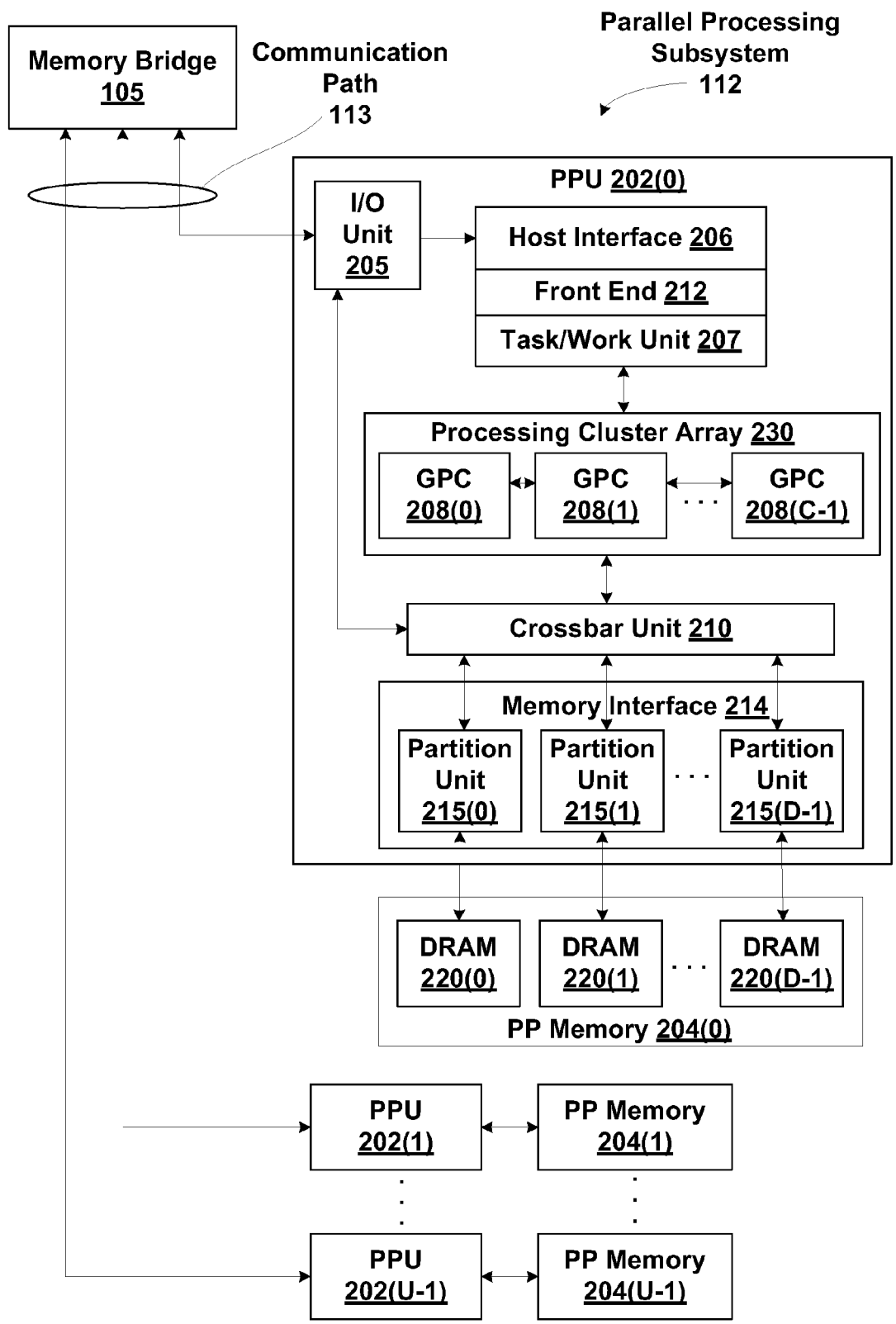
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1 as well as FIG. 2, in some embodiments, some or all of PPUs 202 in parallel processing subsystem 112 are graphics processors with rendering pipelines that can be configured to perform various operations related to generating pixel data from graphics data supplied by CPU 102 and/or system memory 104 via memory bridge 105 and the second communication path 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have a dedicated parallel processing memory device(s) or no dedicated parallel processing memory device(s). One or more PPUs 202 in parallel processing subsystem 112 may output data to display device 110 or each PPU 202 in parallel processing subsystem 112 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a data structure (not explicitly shown in either FIG. 1 or FIG. 2) that may be located in system memory 104, parallel processing memory 204, or another storage location accessible to both CPU 102 and PPU 202. A pointer to each data structure is written to a pushbuffer to initiate processing of the stream of commands in the data structure. The PPU 202 reads command streams from one or more pushbuffers and then executes commands asynchronously relative to the operation of CPU 102. Execution priorities may be specified for each pushbuffer by an application program via the device driver 103 to control scheduling of the different pushbuffers.

Referring back now to FIG. 2 as well as FIG. 1, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI Express link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the command stream stored in the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary dependent on the workload arising for each type of program or computation.

GPCs 208 receive processing tasks to be executed from a work distribution unit within a task/work unit 207. The work distribution unit receives pointers to processing tasks that are encoded as task metadata (TMD) and stored in memory. The pointers to TMDs are included in the command stream that is stored as a pushbuffer and received by the front end unit 212 from the host interface 206. Processing tasks that may be encoded as TMDs include indices of data to be processed, as well as state parameters and commands defining how the data is to be processed (e.g., what program is to be executed). The task/work unit 207 receives tasks from the front end 212 and ensures that GPCs 208 are configured to a valid state before the processing specified by each one of the TMDs is initiated. A priority may be specified for each TMD that is used to schedule execution of the processing task. Processing tasks can also be received from the processing cluster array 230. Optionally, the TMD can include a parameter that controls whether the TMD is added to the head or the tail for a list of processing tasks (or list of pointers to the processing tasks), thereby providing another level of control over priority.

Memory interface 214 includes a number D of partition units 215 that are each directly coupled to a portion of parallel processing memory 204, where D≥1. As shown, the number of partition units 215 generally equals the number of dynamic random access memory (DRAM) 220. In other embodiments, the number of partition units 215 may not equal the number of memory devices. Persons of ordinary skill in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI Express) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Multiple Concurrent Task Scheduling

Multiple processing tasks may be executed concurrently on the GPCs 208 and a processing task may generate one or more "child" processing tasks during execution. The task/work unit 207 receives the tasks and dynamically schedules the processing tasks and child processing tasks for execution by the GPCs 208.

Figure 3A:
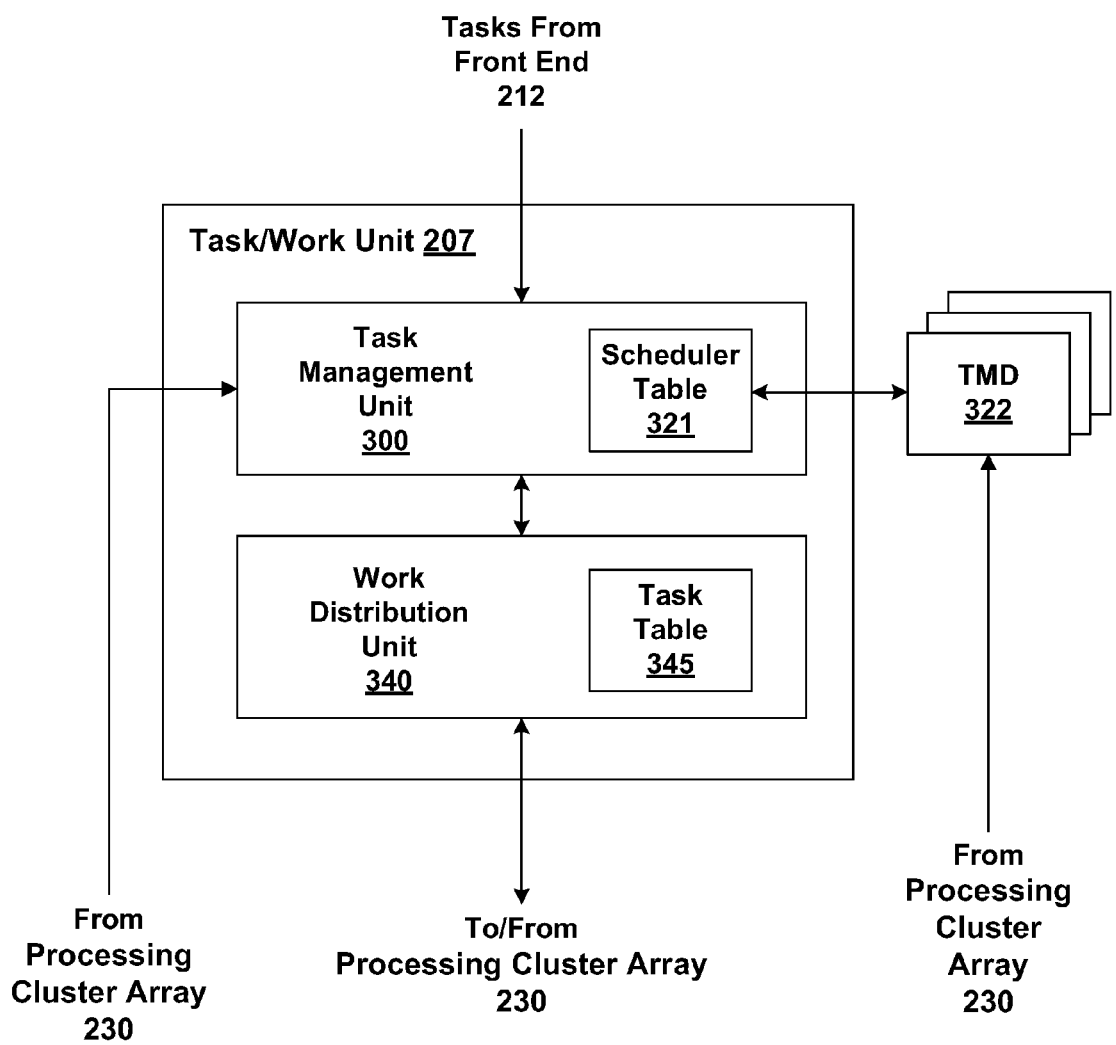
FIG. 3A is a block diagram of the front end of FIG. 2, according to one embodiment of the present invention.

FIG. 3A is a block diagram of the task/work unit 207 of FIG. 2, according to one embodiment of the present invention. The task/work unit 207 includes a task management unit 300 and the work distribution unit 340. The task management unit 300 organizes tasks to be scheduled based on execution priority levels. For each priority level, the task management unit 300 stores a list of pointers to the TMDs 322 corresponding to the tasks in the scheduler table 321, where the list may be implemented as a linked list. The TMDs 322 may be stored in the PP memory 204 or system memory 104. The rate at which the task management unit 300 accepts tasks and stores the tasks in the scheduler table 321 is decoupled from the rate at which the task management unit 300 schedules tasks for execution. Therefore, the task management unit 300 may collect several tasks before scheduling the tasks. The collected tasks may then be scheduled based on priority information or using other techniques, such as round-robin scheduling.

The work distribution unit 340 includes a task table 345 with slots that may each be occupied by the TMD 322 for a task that is being executed. The task management unit 300 may schedule tasks for execution when there is a free slot in the task table 345. When there is not a free slot, a higher priority task that does not occupy a slot may evict a lower priority task that does occupy a slot. When a task is evicted, the task is stopped, and if execution of the task is not complete, then a pointer to the task is added to a list of task pointers to be scheduled so that execution of the task will resume at a later time. When a child processing task is generated, during execution of a task, a pointer to the child task is added to the list of task pointers to be scheduled. A child task may be generated by a TMD 322 executing in the processing cluster array 230.

Unlike a task that is received by the task/work unit 207 from the front end 212, child tasks are received from the processing cluster array 230. Child tasks are not inserted into pushbuffers or transmitted to the front end. The CPU 102 is not notified when a child task is generated or data for the child task is stored in memory. Another difference between the tasks that are provided through pushbuffers and child tasks is that the tasks provided through the pushbuffers are defined by the application program whereas the child tasks are dynamically generated during execution of the tasks.

Task Processing Overview

Figure 3B:
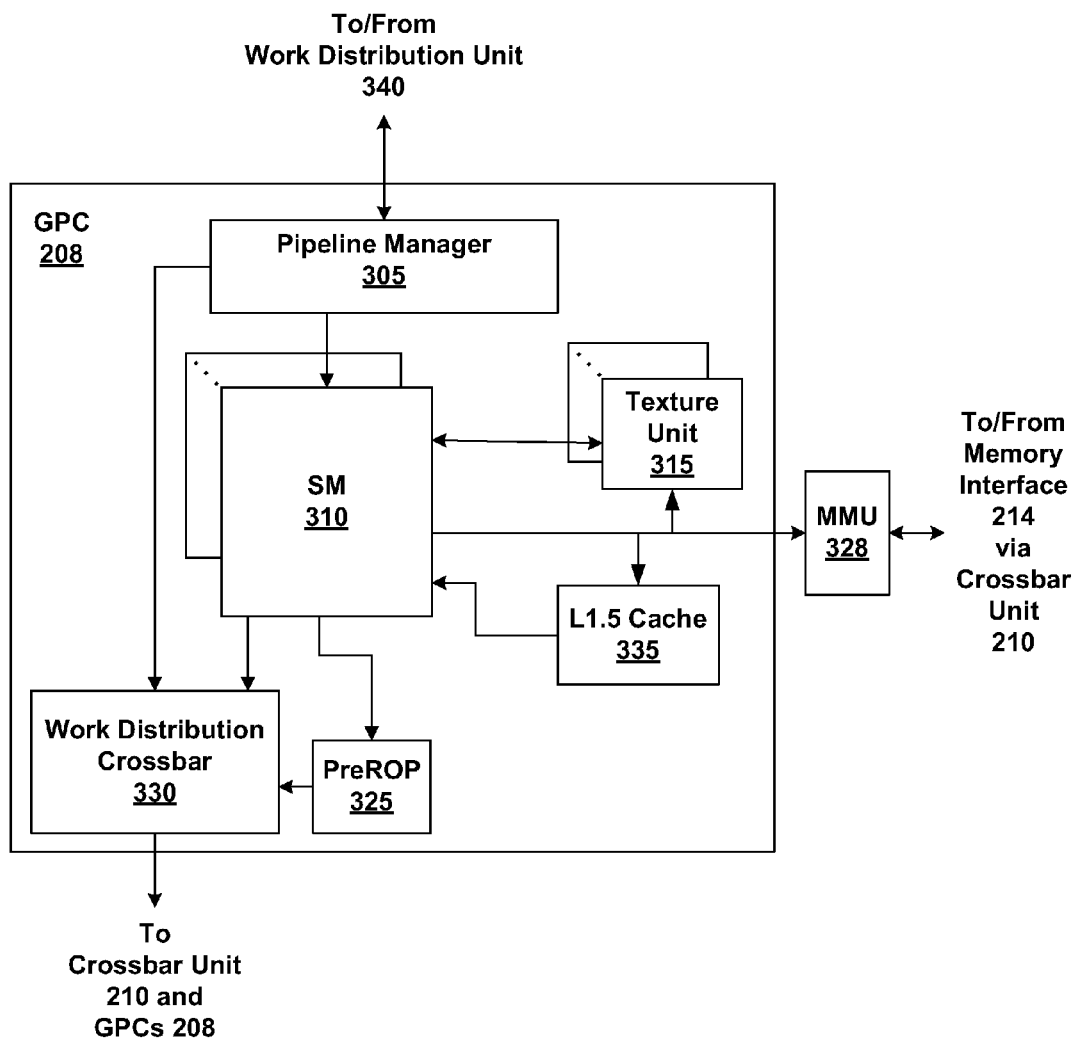
FIG. 3B is a block diagram of a general processing cluster within one of the parallel processing units (PPUs) of FIG. 2, according to one embodiment of the present invention.

FIG. 3B is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons of ordinary skill in the art will understand that a SIMD processing regime represents a functional subset of a SIMT processing regime.

Operation of GPC 208 is advantageously controlled via a pipeline manager 305 that distributes processing tasks to streaming multiprocessors (SMs) 310. Pipeline manager 305 may also be configured to control a work distribution crossbar 330 by specifying destinations for processed data output by SMs 310.

In one embodiment, each GPC 208 includes a number M of SMs 310, where M≥1, each SM 310 configured to process one or more thread groups. Also, each SM 310 advantageously includes an identical set of functional execution units (e.g., execution units and load-store units—shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SM 310 is referred to herein as a "warp" or "thread group." As used herein, a "thread group" refers to a group of threads concurrently executing the same program on different input data, with one thread of the group being assigned to a different processing engine within an SM 310. A thread group may include fewer threads than the number of processing engines within the SM 310, in which case some processing engines will be idle during cycles when that thread group is being processed. A thread group may also include more threads than the number of processing engines within the SM 310, in which case processing will take place over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SM 310, and m is the number of thread groups simultaneously active within the SM 310. The size of a CTA is generally determined by the programmer and the amount of hardware resources, such as memory or registers, available to the CTA.

Each SM 310 contains a level one (L1) cache (shown in FIG. 3C) or uses space in a corresponding L1 cache outside of the SM 310 that is used to perform load and store operations. Each SM 310 also has access to level two (L2) caches that are shared among all GPCs 208 and may be used to transfer data between threads. Finally, SMs 310 also have access to off-chip "global" memory, which can include, e.g., parallel processing memory 204 and/or system memory 104. It is to be understood that any memory external to PPU 202 may be used as global memory. Additionally, a level one-point-five (L1.5) cache 335 may be included within the GPC 208, configured to receive and hold data fetched from memory via memory interface 214 requested by SM 310, including instructions, uniform data, and constant data, and provide the requested data to SM 310. Embodiments having multiple SMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SM 310 or the L1 cache or GPC 208.

The physical address is processed to distribute surface data access locality to allow efficient request interleaving among partition units 215. The cache line index may be used to determine whether or not a request for a cache line is a hit or miss.

In graphics and computing applications, a GPC 208 may be configured such that each SM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SM 310 and is fetched from an L2 cache that is shared between all GPCs 208, parallel processing memory 204, or system memory 104, as needed. Each SM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SMs 310 or texture units 315, preROPs 325 may be included within a GPC 208. Further, as shown in FIG. 2, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches to execute tasks for one or more application programs.

Persons of ordinary skill in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 202 or other processor(s) of a computing system to execute general-purpose computations using thread arrays. Each thread in the thread array is assigned a unique thread identifier ("thread ID") that is accessible to the thread during the thread's execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Figure 3C:
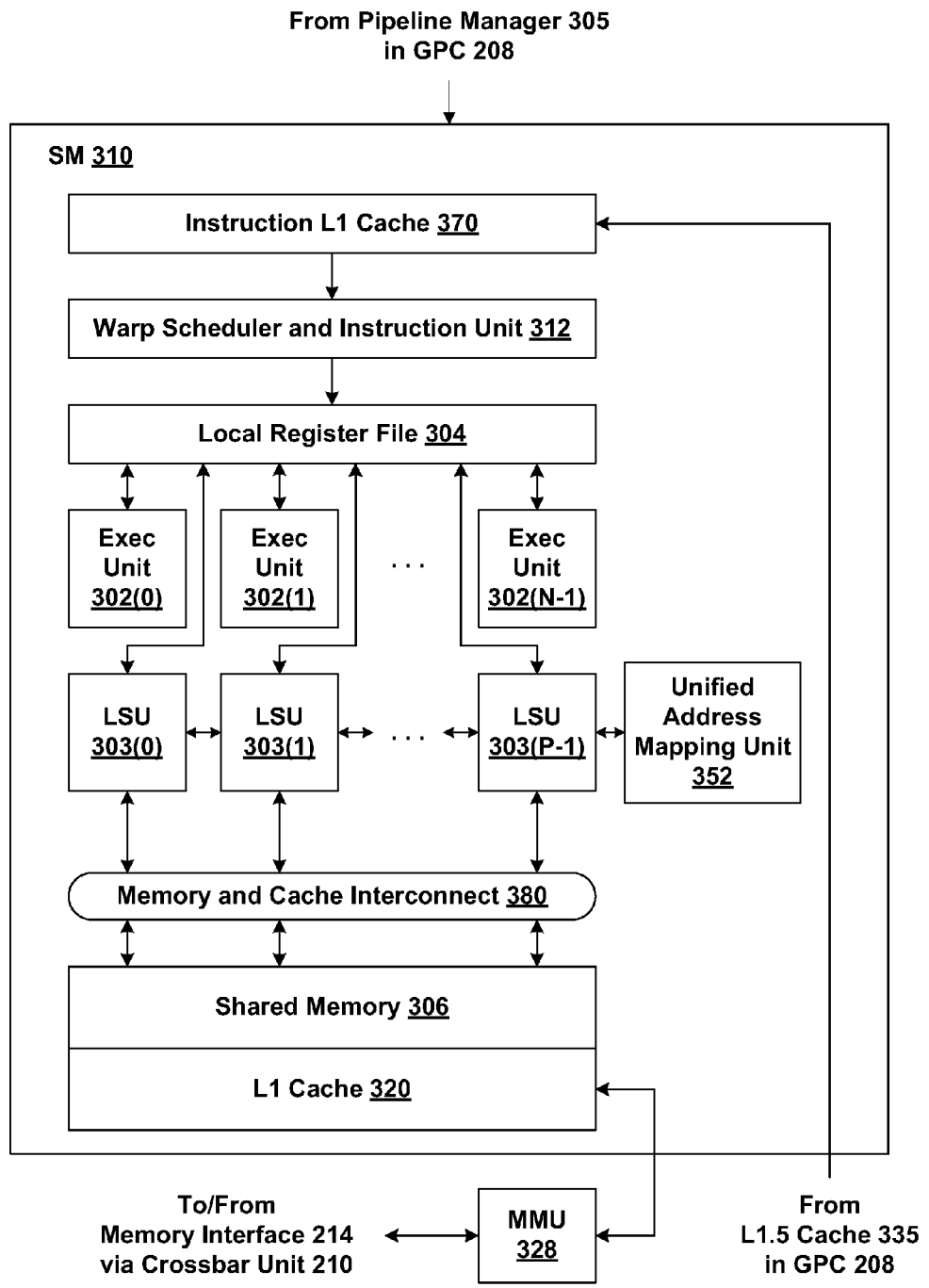
FIG. 3C is a block diagram of a portion of the streaming multiprocessor of FIG. 3B, according to one embodiment of the present invention.

FIG. 3C is a block diagram of the SM 310 of FIG. 3B, according to one embodiment of the present invention. The SM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SM 310 functional units according to the instructions and constants. The SM 310 functional units include N exec (execution or processing) units 302 and P load-store units (LSU) 303.

SM 310 provides on-chip (internal) data storage with different levels of accessibility. Special registers (not shown) are readable but not writeable by LSU 303 and are used to store parameters defining each thread's "position." In one embodiment, special registers include one register per thread (or per exec unit 302 within SM 310) that stores a thread ID; each thread ID register is accessible only by a respective one of the exec unit 302. Special registers may also include additional registers, readable by all threads that execute the same processing task represented by a TMD 322 (or by all LSUs 303) that store a CTA identifier, the CTA dimensions, the dimensions of a grid to which the CTA belongs (or queue position if the TMD 322 encodes a queue task instead of a grid task), and an identifier of the TMD 322 to which the CTA is assigned.

If the TMD 322 is a grid TMD, execution of the TMD 322 causes a fixed number of CTAs to be launched and executed to process the fixed amount of data stored in the queue 525. The number of CTAs is specified as the product of the grid width, height, and depth. The fixed amount of data may be stored in the TMD 322 or the TMD 322 may store a pointer to the data that will be processed by the CTAs. The TMD 322 also stores a starting address of the program that is executed by the CTAs.

If the TMD 322 is a queue TMD, then a queue feature of the TMD 322 is used, meaning that the amount of data to be processed is not necessarily fixed. Queue entries store data for processing by the CTAs assigned to the TMD 322. The queue entries may also represent a child task that is generated by another TMD 322 during execution of a thread, thereby providing nested parallelism. Typically, execution of the thread, or CTA that includes the thread, is suspended until execution of the child task completes. The queue may be stored in the TMD 322 or separately from the TMD 322, in which case the TMD 322 stores a queue pointer to the queue. Advantageously, data generated by the child task may be written to the queue while the TMD 322 representing the child task is executing. The queue may be implemented as a circular queue so that the total amount of data is not limited to the size of the queue.

CTAs that belong to a grid have implicit grid width, height, and depth parameters indicating the position of the respective CTA within the grid. Special registers are written during initialization in response to commands received via front end 212 from device driver 103 and do not change during execution of a processing task. The front end 212 schedules each processing task for execution. Each CTA is associated with a specific TMD 322 for concurrent execution of one or more tasks. Additionally, a single GPC 208 may execute multiple tasks concurrently.

A parameter memory (not shown) stores runtime parameters (constants) that can be read but not written by any thread within the same CTA (or any LSU 303). In one embodiment, device driver 103 provides parameters to the parameter memory before directing SM 310 to begin execution of a task that uses these parameters. Any thread within any CTA (or any exec unit 302 within SM 310) can access global memory through a memory interface 214. Portions of global memory may be stored in the L1 cache 320.

Local register file 304 is used by each thread as scratch space; each register is allocated for the exclusive use of one thread, and data in any of local register file 304 is accessible only to the thread to which the register is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers. Additionally, a uniform L1 cache 375 stores uniform or constant values for each lane of the N exec units 302 and P load-store units LSU 303.

Shared memory 306 is accessible to threads within a single CTA; in other words, any location in shared memory 306 is accessible to any thread within the same CTA (or to any processing engine within SM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and task ID, as well as CTA and grid dimensions or queue position, implementing portions of the special registers. Each LSU 303 in SM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 cache 320 in each SM 310 can be used to cache private per-thread local data and also per-application global data. In some embodiments, the per-CTA shared data may be cached in the L1 cache 320. The LSUs 303 are coupled to the shared memory 306 and the L1 cache 320 via a memory and cache interconnect 380.

Graphics Pipeline Architecture

Figure 4:
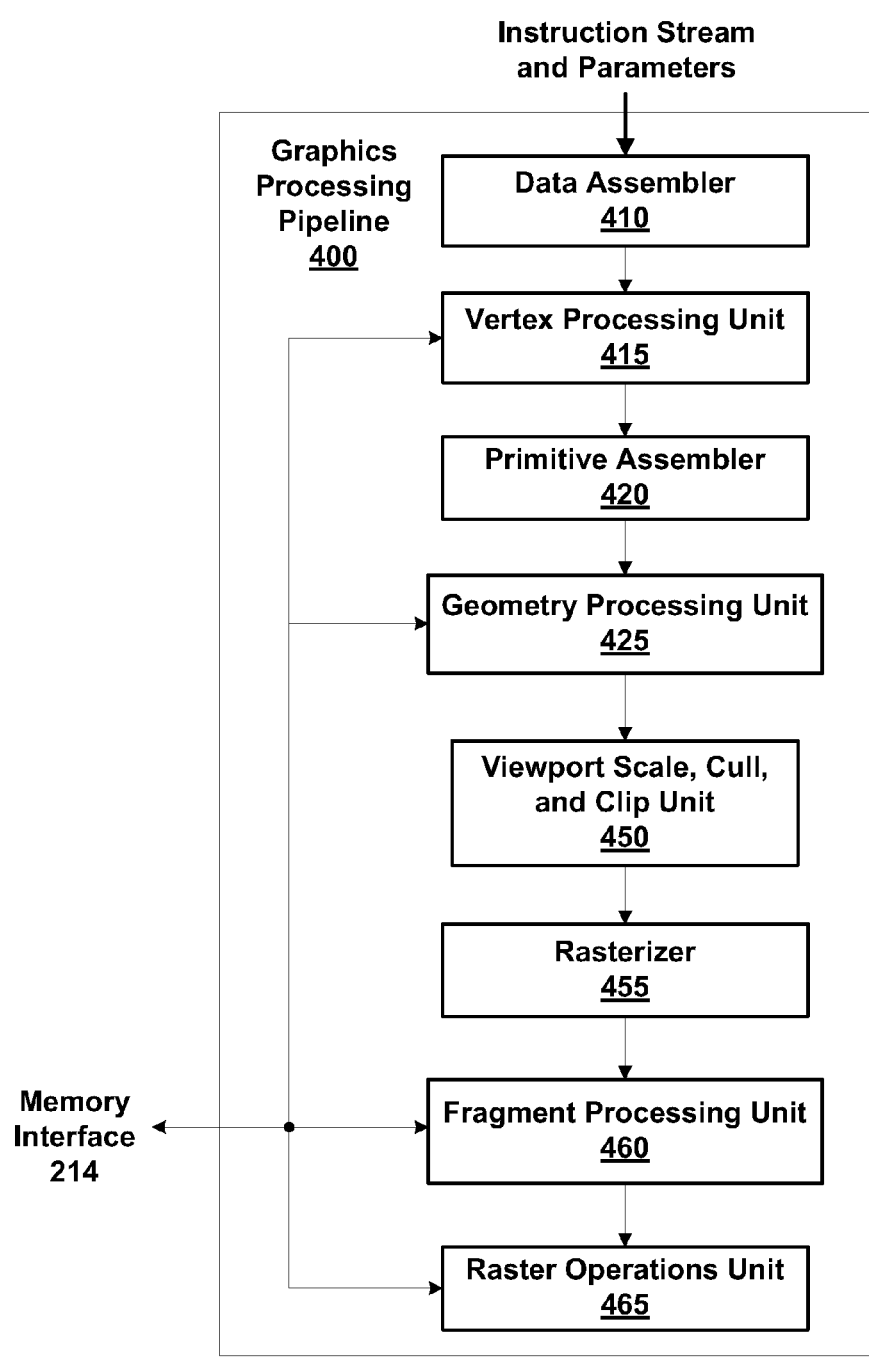
FIG. 4 is a conceptual diagram of a graphics processing pipeline that one or more of the PPUs of FIG. 2 can be configured to implement, according to one embodiment of the present invention.

FIG. 4 is a conceptual diagram of a graphics processing pipeline 400, that one or more of the PPUs 202 of FIG. 2 can be configured to implement, according to one embodiment of the present invention. For example, one of the SMs 310 may be configured to perform the functions of one or more of a vertex processing unit 415, a geometry processing unit 425, and a fragment processing unit 460. The functions of data assembler 410, primitive assembler 420, rasterizer 455, and color raster operations (CROP) unit 465 may also be performed by other processing engines within a GPC 208 and a corresponding partition unit 215. Alternately, graphics processing pipeline 400 may be implemented using dedicated processing units for one or more functions.

Data assembler 410 processing unit collects vertex data for high-order surfaces, primitives, and the like, and outputs the vertex data, including the vertex attributes, to vertex processing unit 415. Vertex processing unit 415 is a programmable execution unit that is configured to execute vertex shader programs, lighting and transforming vertex data as specified by the vertex shader programs. For example, vertex processing unit 415 may be programmed to transform the vertex data from an object-based coordinate representation (object space) to an alternatively based coordinate system such as world space or normalized device coordinates (NDC) space. Vertex processing unit 415 may read data that is stored in L1 cache 320, parallel processing memory 204, or system memory 104 by data assembler 410 for use in processing the vertex data.

Primitive assembler 420 receives vertex attributes from vertex processing unit 415, reading stored vertex attributes, as needed, and constructs graphics primitives for processing by geometry processing unit 425. Graphics primitives include triangles, line segments, points, and the like. Geometry processing unit 425 is a programmable execution unit that is configured to execute geometry shader programs, transforming graphics primitives received from primitive assembler 420 as specified by the geometry shader programs. For example, geometry processing unit 425 may be programmed to subdivide the graphics primitives into one or more new graphics primitives and calculate parameters, such as plane equation coefficients, that are used to rasterize the new graphics primitives.

In some embodiments, geometry processing unit 425 may also add or delete elements in the geometry stream. Geometry processing unit 425 outputs the parameters and vertices specifying new graphics primitives to a viewport scale, cull, and clip unit 450. Geometry processing unit 425 may read data that is stored in parallel processing memory 204 or system memory 104 for use in processing the geometry data. Viewport scale, cull, and clip unit 450 performs clipping, culling, and viewport scaling and outputs processed graphics primitives to a rasterizer 455.

Rasterizer 455 scan converts the new graphics primitives and outputs fragments and coverage data to fragment processing unit 460. Additionally, rasterizer 455 may be configured to perform z culling and other z-based optimizations.

Fragment processing unit 460 is a programmable execution unit that is configured to execute fragment shader programs, transforming fragments received from rasterizer 455, as specified by the fragment shader programs. For example, fragment processing unit 460 may be programmed to perform operations such as perspective correction, texture mapping, shading, blending, and the like, to produce shaded fragments that are output to CROP unit 465. Fragment processing unit 460 may read data that is stored in parallel processing memory 204 or system memory 104 for use in processing the fragment data. Fragments may be shaded at pixel, sample, or other granularity, depending on the programmed sampling rate.

CROP unit 465 is a processing unit that performs raster operations, such color blending, and the like, and outputs pixel data as processed graphics data for storage in graphics memory. The processed graphics data may be stored in graphics memory, e.g., parallel processing memory 204, and/or system memory 104, for display on display device 110 or for further processing by CPU 102 or parallel processing subsystem 112. In certain embodiments, each pixel comprises multiple color samples. In such embodiments, CROP unit 465 is configured to compress color sample data that is written to memory and decompress color sample data that is read from memory. The goal of this compression technique is not to reduce the size of an image in memory, but rather to reduce processing associated with the image by representing all samples for a given pixel by one set of sample values that require processing. In a typical scene, a majority of pixels comprise color samples of equal value and this compression technique enables improved processing performance. Multiple color samples are combined to generate an anti-aliased pixel within a resulting image for display or further processing. When all color samples associated with a particular pixel are equal in value, one color sample is stored for the pixel and status information for the pixel is set to indicate that the samples are compressed. In one embodiment, samples associated with a pixel will have equal color when a corresponding fragment fully covers the pixel. Color samples for each pixel within the image may be combined to generate an anti-aliased pixel for display.

Iterated Blend Unit

Embodiments of the present invention enable a parallel processing subsystem, such as a GPU, to perform complex blend operations within CROP 465 of FIG. 4. With these complex blend operations available, content for graphics rendering standards such as OpenVG, SVG, Cairo, Skia, JavaFX, Adobe Flash, Adobe PDF, Apple's Quartz 2D, and HTML5 may be efficiently rendered within the GPU, thereby beneficially improving system performance. To support complex blend operations, CROP 465 is configured to implement a multi-pass blending operation on source and destination data. In one embodiment, each pass of the multi-pass blending operation comprises a sum of two products, as set forth below in greater detail.

A conventional CROP unit implements a blend comprising a sum of two products, specified by Equation 1, below:

$$src\_color * src\_coefficient + dst\_color * dst\_coefficient \quad (Eq.\ 1)$$

Here, 'src' refers to data received from upstream, such as color and opacity data computed in fragment shader 460. Here also, 'dst' refers to data already stored in a render target, such as in frame buffer memory. For example, a blend operation that combines an upstream src_color that is 70% opaque with a dst_color would be performed with a src_coefficient of 0.70 and a dst_coefficient of 0.30, so that src_color contributes 70% and dst_color contributes 30% of a blended color stored in the frame buffer. Conventional GPUs support this type of blend operation, which is essentially a single-pass blend, as a native CROP blend operation. However, more complex blend operations are not conventionally supported as CROP blend operations. One example of a complex blend operation not supported by a conventional CROP unit is a soft light blend operation implemented in Adobe's Flash format. The soft light blend is illustrated below in Table 1.

TABLE 1

| (src > 0.5) ? | // if |
|---|---|
| 1−(1−dst)*(1−(src−0.5)) : | // then |
| dst*(src+0.5) | // else |

Embodiments of the present invention implement complex blend operations by decomposing each complex blend operation into a series of simple blend passes, where each blend pass requires only a sum of two products. For example, the complex blend operation shown above in Table 1 may be decomposed an implemented as three blend passes, each comprising a sum or two products. These three blend passes are illustrated below in Table 2. Conditional execution and temporary storage are added to the basic function of a CROP blend unit. Temporary storage, indicated by variable 'T' enables intermediate results to be used between blend passes.

TABLE 2

| Pass1: if (src <= 0.5) | T = dst * src + 0.5 *dst |
|---|---|
| Pass2: if (src > 0.5) | T = (1−dst) * src − 0.5 |
| Pass3: if (src > 0.5) | T = T + 1.5*dst |

In the example of Table 2, pass1 conditional operator "if (src<=0.5)" may evaluate to execute a pass1 assignment operation "T=dst*src+0.5*dst" during pass1. A pass2 conditional operator "if (src>0.5)" may evaluate to execute a pass2 assignment operation "T=(1−dst)*src−0.5" during pass2. Similarly, a pass3 conditional operator "if (src>0.5)" may evaluate to execute a pass3 assignment operation "T=T+ 1.5*dst" during pass2. As specified, the pass1 conditional operator is mutually exclusive to the pass2 and pass3 conditional operators so that either the pass1 assignment operation will be executed for a given src data or pass2 and pass3 assignment operations will be executed for the src data. In one embodiment, pass1, pass2, and pass3 are performed for each pixel being blended, with assignment operations occurring in either pass1 or in both pass2 and pass3. After pass3 is complete, variable T holds a final blend value for a corresponding pixel. This final blend value may be written to a frame buffer image.

As illustrated above, a temporary value associated with a given blend pass may be stored in temporary variable 'T' during one pass and made available for blend computations in a subsequent blend pass. An array of one or more temporary variables is denoted herein as T[k], where "k" represents an array index for selecting one of the one or more temporary variables T[k]. In one embodiment, each T[k] is initially set to zero, prior to beginning a blending operation on a new pixel. An interpretation of the behavior of temporaries is that each blend pass includes an implicit 'else' that recirculates temporary variables so they may be available in a subsequent blend pass on the same pixel.

Multiple samples comprising a pixel are each processed according to a selected complex blend operation. Each sample may include different color samples comprising source data for a complex blend operation. For example, a pixel may include a set of four color samples, referred to herein as a quad. A complex blend operation on a quad comprises performing the complex blend operation on each color sample associated with the quad to generate four blended color samples.

Each sample may include an alpha (opacity) value. In one operating mode, an alpha blend is performed for each sample with resulting alpha values stored until passes on related color (red, green, and blue) data are complete. Resulting alpha values are then paired with their related color data and stored together as pixel samples, for example within an image buffer. In an iterated alpha operating mode, alpha values associated with each sample are processed identically as corresponding color data.

In general, each complex blend mode may be decomposed into a sequence of iterations comprising an ordinary blend equation, defined as a sum of two products (A*B+C*D). Different temporary values T[k] may be generated and used as input to the blend equation in a given iteration, where 'k' is an index to reference a temporary value. A basic programming model for a blend program implementing a complex blend mode is illustrated in Table 3 below. During each pass (p), data from various sources may be selected for each variable A, B, C, D, and k.

A conditional (cond) needs to be satisfied for an assignment to be executed in a given pass. Each conditional evaluates to a Boolean value of TRUE or FALSE. In one embodiment, eight condition functions are implemented, including greater than, greater than or equal to, equal to, not equal to, less than or equal to, less than, never (false), and always (true). Conditionals are evaluated for each component (e.g., red, green, blue), and each conditional evaluation is performed per component.

Each different complex blending mode defines a total number of passes (N_PASSES), along with variable selection information for variables A, B, C, D, and k for each pass.

TABLE 3

```
for (p = 0, p < N_PASSES, p++)
    if (cond) T[k] = (A * B) + (C * D)
```

In one embodiment, temporary values are initialized to zero at the start of each complex blending operation. Each final output of an iterated blend operation will either be the result an assignment in the last pass of the blend program or T[0], if a conditional for the last pass evaluates to FALSE. The output data will have been stored in T[0] in a previous pass if the conditional in the last blend pass evaluates to FALSE. Persons of ordinary skill in the art will recognize that alternative rules for assigning output data may be implemented without departing the scope and spirit of embodiments of the present invention. In one embodiment, a maximum number of passes is set to 128 for any complex blend mode. Alternatively, more or fewer passes may be executed per complex blending mode.

In certain embodiments, a previous blender result (PBR) is stored at each pass and made available as an input to a subsequent pass. Using PBR as an input may save power in certain scenarios because PBR is available from a local register rather than from a random access memory (RAM) instance that may require more power to read and write.

In certain implementations, a blend circuit implements the sum of two products blend function. A recirculation path is added from the blend circuit output to the blend circuit input. The recirculation path may include a storage for up to a maximum number of quads being processed, allowing each quad to pass through the blend circuit for multiple pass iterations. The maximum number of quads may be selected according to a number of processing stages are required to perform one pass. In one embodiment, up to seven quads may be in flight within the recirculation path, which comprises seven processing stages.

To facilitate certain complex blend operations, a set of functions is implemented to act on input data associated with a given pass or to act on output data associated with the pass. Each input value to the blend circuit is selected from a set of input operators that may include, without limitation, a constant zero, a constant one, a constant color, source color, source alpha, destination color, destination alpha, one minus source alpha or destination alpha, a temporary value T[k], a minimum operation, a maximum operation, an absolute value operations, a negate operation, a PBR, a reciprocal operation, a square root operation, and a reciprocal of a square root. Operators on output data from a blend pass may include, without limitation, data swizzle operators, and write mask operators. Each color channel (red, green, blue, alpha) of each sample is computed independently using a set of input values and output operators defined for a particular pass. Additional functions may also implement a dot product operator, a vector normalize operator, and the like. Certain functions, such as reciprocal, square root, and other arbitrarily defined functions, may be implemented via a piecewise linear approximation of the function. Any technically feasible technique may be used to implement the piecewise linear approximation, and any smoothing and interpolation technique may be used without departing the scope and spirit of the present invention.

For blend operations having compressed source and destination color components, only one blend operation need be performed on the representative color rather than on each independent sample. For configurations having four samples per pixel, this represents approximately one quarter the processing requirement of blending each component. This efficiency benefit scales with the number of samples per pixel.

Figure 5:
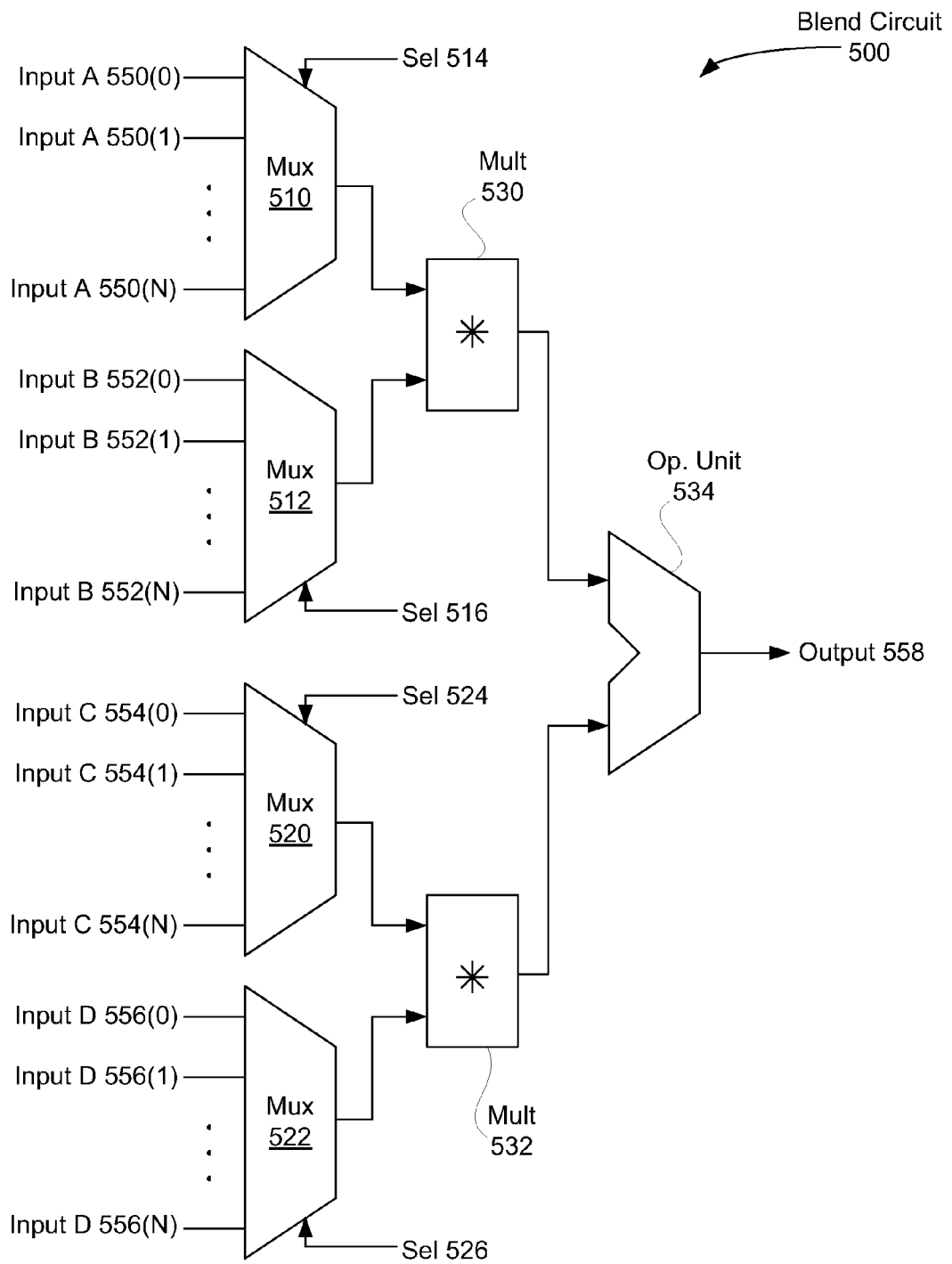
FIG. 5 illustrates a blend circuit configured to implement one pass of an iterated blend operation, according to one embodiment of the present invention.

FIG. 5 illustrates a blend circuit 500 configured to implement one pass of an iterated blend operation, according to one embodiment of the present invention. Operation (op) unit 534 and multipliers 530, 532 are configured to perform at least a sum of products operation of the form A*B+C*D to generate output 558. Operation unit 534 is configured to perform at least addition and subtraction operations. Select signal 514 causes multiplexor 510 to select one of inputs A 550 to serve as the A variable in the sum of products operation. Select signal 516 causes multiplexor 512 to select one of inputs B 552 to serve as the B variable. Select signal 524 causes multiplexor 520 to select one of inputs C 554 to serve as the C variable. Select signal 526 causes multiplexor 522 to select one of inputs D 556 to serve as the D variable. Select signals 514, 516, 524, and 526 are configured based on an instruction selected for a particular pass as well as results of a previous conditional evaluation. In one embodiment, four instances of blend circuit 500 operate in parallel to compute red, green, blue, and alpha values for a sample. An arbitrary number of instances may be implemented to achieve a particular level of overall parallelism. Each input value 550, 552, 554, 556 may comprise a floating point value, such as a sixteen bit floating point value.

Inputs 550(0) through 550(N) correspond to available inputs comprising the set of input operators for the A variable. Similarly, inputs 552, 554, and 556 correspond to available inputs comprising sets of input operators for the respective B, C, and D variables.

Figure 6:
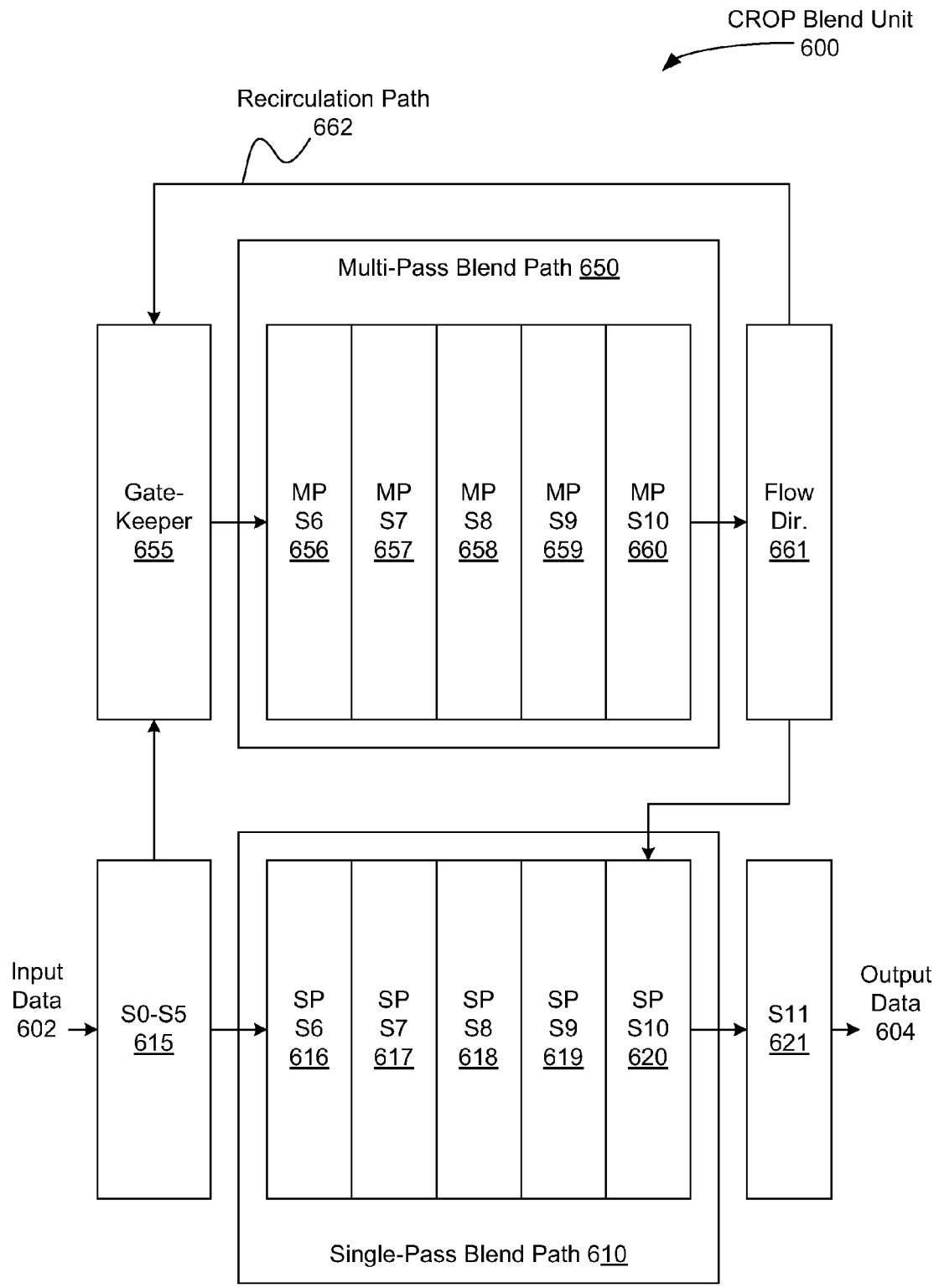
FIG. 6 illustrates a color raster operations blend unit configured to implement iterated blend operations, according to one embodiment of the present invention.

FIG. 6 illustrates CROP blend unit 600 configured to implement iterated blend operations, according to one embodiment of the present invention. In one embodiment CROP blend unit 600 resides within CROP unit 465 of FIG.

4, and graphics processing pipeline 400 is implemented within a GPU, such as parallel processing subsystem 112.

CROP blend unit 600 comprises a single-pass blend path 610, and a multi-pass blend path 650 configured to recirculate data results for successive iterations via recirculation path 662. When a single-pass blend mode is active, the single-pass blend path 610 computes blend operations for incoming pixels and multi-pass blend path 650 is put into a low power state. When a multi-pass blend mode is active, the multi-pass blend path 650 computes blend operations for incoming pixels via two or more passes (iterations) comprising blending operations on the incoming pixels. In alternative embodiments, only the multi-pass blend path 650 is implemented and is configured to also execute single-pass blending operations. Such alternative embodiments may consume more power on average because more circuitry is involved in single-pass blend operations, which tend to dominate any given scene.

In one embodiment, recirculation path 662 is configured to transmit up to seven quads in flight (pipelined) and allows each quad to go through the multi-pass blend path 650 multiple times, executing sequences of basic blend operations that together enable complex blend modes. In above soft light blend example of Table 2, each soft light blend requires 3 iterations, one for each pass listed. In this example, throughput for those pixels requiring a soft light blend would be one third that of a single pass blend. Since src data and dst data may be needed in more than one blend pass, this data is recirculated and pushed into a fifo that will match the latency of the blender. Temporary data, including at least T[0] . . . T[2], is also recirculated for use in multiple iterations.

Embodiments comprising both multi-pass blend path 650 and single-pass blend path 610 exhibit latency characteristics of single-pass blending modes, with dynamic power increasing to support multi-pass blending modes only when multi-pass blending is required. Because multi-pass blend path 650 requires no persistent state once processing is complete, multiple architectural strategies for power savings are available, including powering-off circuitry comprising multi-pass blend path 650.

In one embodiment, CROP blend unit 600 processes source and destination data in a series of pipeline stages. Source and destination data may each comprise different data formats having different data rates per pixel and different color representation formats. Source and destination data are prepared for blending by stages S0-S5 615, which map the source and destination data to the same format. Circuitry associated with blending operations is simplified by needing to support only one format. In one embodiment, source and destination data are mapped to a floating point representation, such as a sixteen-bit floating point representation, for blending. Resulting data from blend operations may need to be represented and stored in one of various available formats. Stage S11 621 is configured to reformat the resulting data to a destination format for storage. In one embodiment, reformatting the resulting data comprises clamping to a specified range, such as a range from 0.0 to 1.0 or −1.0 to 1.0.

Stages SP S6 616 through SP S10 620 comprise single-pass blend path 610. Basic blend operations defined by one sum of two products may be processed by stages SP S6 616 through SP S10 620. Stages MP S6 656 through MP S10 660 comprise multi-pass blend path 650. Complex blend operations requiring two or more passes may be processed by stages MP S6 656 through MP S10 660. Gatekeeper 655 is configured to admit multi-pass source and destination data into multi-pass blend path 650 for processing. Flow director 661 is configured to either recirculate resulting data back to gatekeeper 655 for re-admission when another processing pass is needed, or transmit resulting data to SP S10 620, which passes the resulting data to S11 621 for reformatting to a destination format.

In one embodiment, gatekeeper 655 admits work to the multi-pass blend path 650 for processing in units of quads. Gatekeeper 655 is configured to attempt to maximize the number of quads being processed within MP blend path 650, without exceeding a maximum number of quads that may be in flight at any one time. In on implementation, gatekeeper 655 admits quads to enter MP blend path 650 until a first quad recirculates back via recirculation path 662, at which point gatekeeper 655 stops admitting new quads for processing into the admitted group of quads. When the last quad in the admitted group is pushed into MP blend path 650 after recirculating via recirculation path 662, gatekeeper 655 may begin admitting new quads for processing. The goal here is for gatekeeper 655 to efficiently admit work for MP blend path 650 while avoiding bubbles and overflows.

Gatekeeper 655 drains MP blend path 650 when quads requiring a different complex blend mode are presented for processing. Gatekeeper 655 also drains MP blend path 650 prior to a context switch event.

In one embodiment, state management for multi-blend path 650 may be implemented to prevent pipeline configuration changes while current transactions are in flight. This simplifies overall state management. Each pass may include a command bundle, which may be decoded upstream and passed along as a decoded command bundle comprising Iterated blend state for each blend pass.

Figure 7:
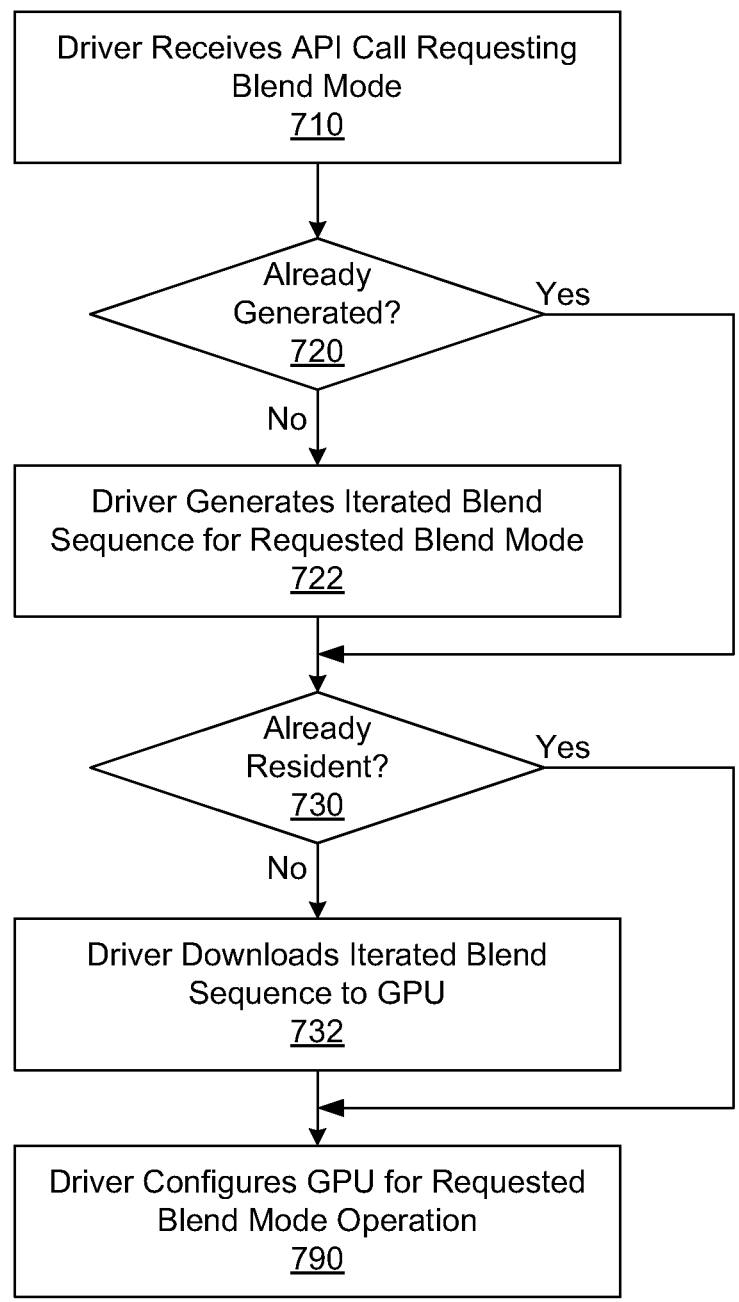
FIG. 7 is a flow diagram of method steps for configuring a color raster operations blend unit to perform iterated blend operations, according to one embodiment of the present invention.

FIG. 7 is a flow diagram of method steps for configuring the color raster operations blend unit to perform iterated blend operations, according to one embodiment of the present invention. Although the method steps are described in conjunction with the systems of FIGS. 1-6, persons of ordinary skill in the art will understand that any system configured to perform the method steps, in any order, is within the scope of the invention. In one embodiment, the method steps are performed by a GPU device driver, such as device driver 103 of FIG. 1.

As shown, a method 700 begins in step 710, where the GPU driver receives an application programming interface (API) call requesting a specific blend mode. This blend mode may be determined by an application program preparing to render content requiring the blend mode. If, in step 720, an iterated blend instruction sequence corresponding to the requested blend mode has not been generated, then the method proceeds to step 722, where the driver generates an iterated blend instruction sequence for the requested blend mode. If, in step 730 the iterated blend instruction sequence is not already resident within an associated GPU then the method proceeds to step 732, where the driver downloads the iterated blend instruction sequence to the GPU. The method terminates after step 790, where the driver configures the GPU to execute the requested blend mode as a blend operation to be performed by CROP unit 465.

Returning to step 720, if the iterated blend instruction sequence corresponding to the requested blend mode has been generated, then the method proceeds to step 730, as described above.

Returning to step 730, above, if the iterated blend instruction sequence is already resident within the GPU then the method proceeds to step 790.

Figure 8:
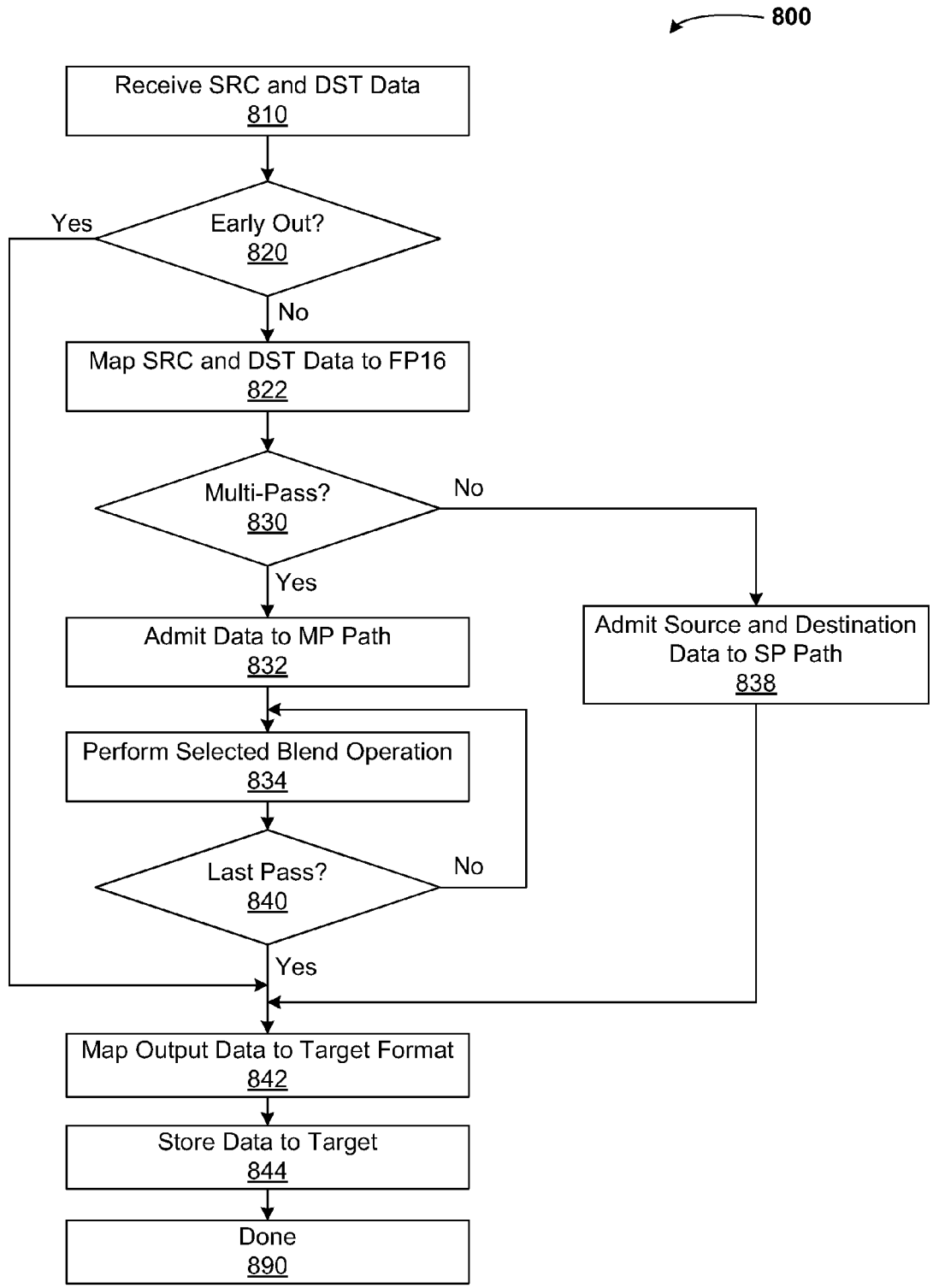
FIG. 8 is a flow diagram of method steps for performing a blend operation, according to one embodiment of the present invention.

FIG. 8 is a flow diagram of method steps for performing a blend operation, according to one embodiment of the present invention. Although the method steps are described in conjunction with the systems of FIGS. 1-6, persons of ordinary skill in the art will understand that any system configured to perform the method steps, in any order, is within the scope of the invention. In one embodiment, method 800 is performed by a CROP unit, such as CROP unit 465 of FIG. 4.

As shown, a method 800 begins in step 810, where the CROP unit receives source data and destination data to be blended according to the blend operation. If, in step 820, the source data and destination data do not indicate an early out condition, then the method proceeds to step 822. An early out condition is defined herein as a condition where either the source data alone or the destination data alone define a blended result, making a blend of the source data and the destination data superfluous. One example of an early out condition is when source data is completely opaque, nullifying any contribution of the destination data during a blend. Another example of an early out condition is when source data is completely transparent, nullifying any contribution of the source data during a blend. In step 822, source and destination data are mapped to a common format, such as a sixteen-bit floating point format. Any other technically feasible format may also be implemented as a common format for blending operations.

If, in step 830, the blend operation is a multi-pass (iterated) blend operation, then the method proceeds to step 832, where a gatekeeper function admits the source data and destination data to a multi-pass (MP). In one embodiment, the gatekeeper function is implemented by gatekeeper 655 of FIG. 6. The gatekeeper function admits enough work into a MP blend path, such as MP blend path 650, to efficiently and correctly utilize the MP blend path computational resource, while avoiding bubbles. In one embodiment, computational state associated with MP blend path 650 is initialized during admission of new data. Computational state may include, without limitation, a pass count, values of T[k], and so forth. The pass count may indicate how many passes have been executed on a particular set of data. In step 834, a selected blend operation is performed on selected input data. For example, a sum of products or difference of products may be performed on four selected operators from a set of input operators, described previously.

If, in step 840, a currently processed blend pass is the last pass, then the method proceeds to step 842, where output data is mapped to a target format. One example of a target format is a screen space red, green, blue (sRGB) eight-bit integer format. In step 844 the output data is stored to a target location in memory, such as an image buffer within PP memory 204 of FIG. 2. The method terminates in step 890. If, however, in step 840, the currently processed blend pass is not the last blend pass, then the method proceeds back to step 834, as described above.

Returning to step 830, if the blend operation is not a multi-pass (iterated) blend operation, then the method proceeds to step 842, as described above.

Returning to step 820, if the source data and destination data do indicate an early out condition, then the method proceeds to step 842, as described above. In one embodiment, if the source data and destination data do indicate an early out condition that nullifies any influence of the source data, then, in step 844, the output data is stored to a target location in memory. The method terminates in step 890.

In one embodiment, an early out condition may be determined based on source data being completely transparent, obviating any write or blend operation with destination data. In certain embodiments, an early out condition may be determined based on destination data being completely opaque, obviating a write or blend operation between source data and destination data. If either early out condition is detected, the method bypasses steps 842-844 and terminates in step 890.

In sum, a technique is disclosed for efficiently performing a complex blend operation within a raster operations unit of a graphics processing unit. The technique decomposes the complex blend operation into a series of two or more iterations, each of which comprises an operation on two products. The operation may comprise, without limitation, a sum or a difference. At least two input values for each product are selected from a set of input operators. In one embodiment, the two products, the operation, and the input operators are performed in a common mathematical representation, such as a sixteen-bit floating point representation. Pixels that only require a single blend operation may be processed according to a conventional blend pipeline to save power.

One advantage of the disclosed technique is that it enables graphics content that requires complex blend modes to be efficiently rendered by a graphics processing unit.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of the present invention is determined by the claims that follow.

What is claimed is:

1. A computer-implemented method for performing a programmable blend operation, the method comprising:
   receiving source pixel data and destination pixel data for processing;
   mapping the source pixel data and the destination pixel data to a uniform arithmetic format;
   determining, via a processor, whether a first blend operation is required based on whether an early-out condition exists; and
   if the early-out condition does not exist, and a first blend operation is required, then performing the first blend operation based on the mapped source pixel data and mapped destination pixel data to generate a first blend result, or
   if the early-out condition exists, and a first blend operation is not required, then performing a by-pass operation and storing the mapped source pixel data or mapped destination pixel data to a render target.

2. The method of claim 1, wherein at least one instruction associated with the programmable blend operation specifies a reciprocal operation, a square root operation, or a piecewise-linear operation.

3. The method of claim 1, wherein at least one instruction associated with the programmable blend operation includes an input operand specified by a constant.

4. The method of claim 1, wherein the source pixel data comprises two or more samples represented by one color and a flag indicating the source pixel data is compressed.

5. The method of claim 1, wherein the early-out condition does not exist, and a first blend operation is required, and further comprising determining whether to perform a multi-pass series of blend operations or a single-pass blend operation.

6. The method of claim 5, wherein a multi-pass series of blend operations are to be performed, and further comprising performing a second blend operation subsequent to the first blend operation based on the source pixel data and destination pixel data to generate a second blend result.

7. The method of claim 6, wherein the second blend operation is also based on at least a value from a temporary variable array or a recent blend result register.

8. The method of claim 1, wherein the early-out condition exists when the source pixel data is either completely opaque or completely transparent.

9. A graphics processing unit, comprising:
  a blend unit configured to perform a programmable blend operation by:
    receiving source pixel data and destination pixel data for processing;
    mapping the source pixel data and the destination pixel data to a uniform arithmetic format;
    determining whether a first blend operation is required based on whether an early-out condition exists; and
    if the early-out condition does not exist, and a first blend operation is required, then performing the first blend operation based on the mapped source pixel data and mapped destination pixel data to generate a first blend result, or
    if the early-out condition exists, and a first blend operation is not required, then performing a by-pass operation and storing the mapped source pixel data or mapped destination pixel data to a render target.

10. The graphics processing unit of claim 9, wherein at least one instruction associated with the programmable blend operation specifies a reciprocal operation, a square root operation, or a piecewise-linear operation.

11. The graphics processing unit of claim 9, wherein at least one instruction associated with the programmable blend operation includes an input operand specified by a constant.

12. The graphics processing unit of claim 9, wherein the source pixel data comprises two or more samples represented by one color and a flag indicating the source pixel data is compressed.

13. The graphics processing unit of claim 9, wherein the early-out condition does not exist, and a first blend operation is required, and the blend unit is further configured to determine whether to perform a multi-pass series of blend operations or a single-pass blend operation.

14. The graphics processing unit of claim 13, wherein a multi-pass series of blend operations are to be performed, and the blend unit is further configured to perform a second blend operation subsequent to the first blend operation based on the source pixel data and destination pixel data to generate a second blend result.

15. The graphics processing unit of claim 14, wherein the second blend operation is also based on at least a value from a temporary variable array or a recent blend result register.

16. The graphics processing unit of claim 9, wherein the early-out condition exists when the source pixel data is either completely opaque or completely transparent.

17. The graphics processing unit of claim 9, wherein the blend unit comprises a raster operations unit.

18. A computing device, comprising:
  a graphics processing unit (GPU) having a blend unit configured to perform a programmable blend operation by:
    receiving source pixel data and destination pixel data for processing;
    mapping the source pixel data and destination pixel data to a uniform arithmetic format;
    determining whether a first blend operation is required based on whether an early-out condition exists; and
    if the early-out condition does not exist, and a first blend operation is required, then performing the first blend operation based on the mapped source pixel data and mapped destination pixel data to generate a first blend result, or
    if the early-out condition exists, and a first blend operation is not required, then performing a by-pass operation and storing the mapped source pixel data or mapped destination pixel data to a render target; and
  a central processing unit (CPU) coupled to the GPU and configured to cause the GPU to perform the programmable blend operation by:
    receiving an application programming interface call requesting the programmable blend operation; and
    transmitting the sequence of instructions to the blend unit within the GPU.

19. The computing device of claim 18, wherein the early-out condition does not exist, and a first blend operation is required, and the blend unit is further configured to:
  determine that a multi-pass series of blend operations, as opposed to a single-pass blend operation, is to be performed; and
  perform a second blend operation subsequent to the first blend operation based on the source pixel data and destination pixel data to generate a second blend result.

* * * * *